(12) United States Patent
Yamauchi et al.

(10) Patent No.: US 6,835,162 B2
(45) Date of Patent: Dec. 28, 2004

(54) AUTOMATIC TRANSMISSION SYSTEM FOR VEHICLE

(75) Inventors: Yasuhiro Yamauchi, Kanagawa (JP); Kenichiro Murakami, Kanagawa (JP); Satoshi Sakakibara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/119,031

(22) Filed: Apr. 10, 2002

(65) Prior Publication Data

US 2002/0147067 A1 Oct. 10, 2002

(30) Foreign Application Priority Data

Apr. 10, 2001 (JP) .................................... 2001-111168

(51) Int. Cl.[7] .............................................. F16H 59/74
(52) U.S. Cl. .................................. 477/101; 74/473.12
(58) Field of Search ...... 477/99, 101; 74/473.12–473.15

(56) References Cited

U.S. PATENT DOCUMENTS

| | | | |
|---|---|---|---|
| 4,373,619 A | | 2/1983 | Schritt et al. |
| 4,922,769 A | | 5/1990 | Tury |
| 4,932,283 A | * | 6/1990 | Ishigami et al. ......... 74/473.23 |
| 4,955,935 A | * | 9/1990 | Katayama ................ 74/473.21 |
| 5,009,295 A | * | 4/1991 | Kinkade et al. .......... 192/220.2 |
| 5,117,710 A | | 6/1992 | Asano et al. |
| 5,647,818 A | * | 7/1997 | Moody ........................ 477/99 |
| 5,775,166 A | | 7/1998 | Osborn et al. |
| 5,853,348 A | * | 12/1998 | Lehman ...................... 477/96 |
| 6,007,451 A | | 12/1999 | Matsui et al. |
| 6,439,014 B1 | * | 8/2002 | Syamoto ..................... 70/247 |
| 6,508,139 B2 | * | 1/2003 | Onodera ..................... 74/335 |

FOREIGN PATENT DOCUMENTS

| | | |
|---|---|---|
| DE | 197 52 752 A2 | 6/1999 |
| DE | 199 13 005 A1 | 10/2000 |
| EP | 0 324 469 A2 | 7/1989 |
| EP | 478453 A1 * 4/1992 | ........... B60R/25/06 |
| JP | 2-256951 A | 10/1990 |
| JP | 5-322031 | 12/1993 |
| JP | 06001157 A * 1/1994 | ........... B60K/23/00 |

* cited by examiner

Primary Examiner—Tisha Lewis
(74) Attorney, Agent, or Firm—Foley & Lardner LLP

(57) ABSTRACT

An automatic transmission system for a vehicle includes a shift-by-wire system which converts a selected command operation range of a range selector into an electric signal and which changes an actual operation range of an automatic transmission into the selected command operation range by driving an actuator according to the electric signal. A lock mechanism restricts the operation of the range selector when the shift-by-wire system is electrically turned off regardless of the present operation range of the range selector.

8 Claims, 8 Drawing Sheets

AUTOMATIC TRANSMISSION SYSTEM FOR VEHICLE

BACKGROUND OF THE INVENTION

The present invention relates to an automatic transmission system for a vehicle.

A shift lever of an automatic transmission system for a vehicle is provided with a shift lock mechanism for preventing a displacement of shift lever until an ignition switch is again turned on when parking range (P range position) is selected by a driver through the shift lever under a condition that the ignition switch is turned off.

Japanese Patent Provisional Publication No. (Heisei) 5-322031 discloses a shift-by-wire type automatic transmission system wherein an operation of a shift lever is converted into an electric signal. A manual valve and a parking mechanism of an automatic transmission are controlled by an electrically operated actuator according to the electric signal to change of an operation range of an automatic transmission.

SUMMARY OF THE INVENTION

However, such a shift-by-wire type automatic transmission system is further required to improve utility in combination with a common shift lock mechanism.

It is therefore an object of the present invention to prove a shift-by-wire type automatic transmission system which preferably controls the operation of a range selector such as a shift lever so as to prevent a discord between an operation range selected by the range selector and an actual operation range selected in an automatic transmission.

An aspect of the present invention resides in an automatic transmission system which is for a vehicle and comprises an automatic transmission, a range selector, a shift-by-wire system and a lock mechanism. The automatic transmission selectively takes a plurality of operation ranges. The range selector is operated by a driver of the vehicle to select one of command operation ranges. The shift-by-wire system converts the selected command operation range into an electric signal and changes an actual operation range of the automatic transmission into the selected command operation range by driving an actuator according to the electric signal. The lock mechanism restricts the operation of the range selector when the shift-by-wire mechanism is electrically turned off.

Another aspect of the present invention resides in a method of controlling an automatic transmission system for a vehicle, the automatic transmission comprising an automatic transmission which selectively takes a plurality of operation ranges, a range selector which is operated by a driver of the vehicle to select one of command operation ranges and a shift-by-wire system which converts the selected command operation range into an electric signal and changes an actual operation range of the automatic transmission into the selected command operation range by driving an actuator according to the electric signal, the method comprising restricting the operation of the range selector when the shift-by-wire mechanism is electrically turned off.

The other objects and features of this invention will become understood from the following description with reference to the accompanying drawings.

DETAILED DESCRIPTION OF THE INVENTION

Referring to FIGS. 1 to 11, there is shown a first embodiment of an automatic transmission system according to the present invention.

Figure 1:
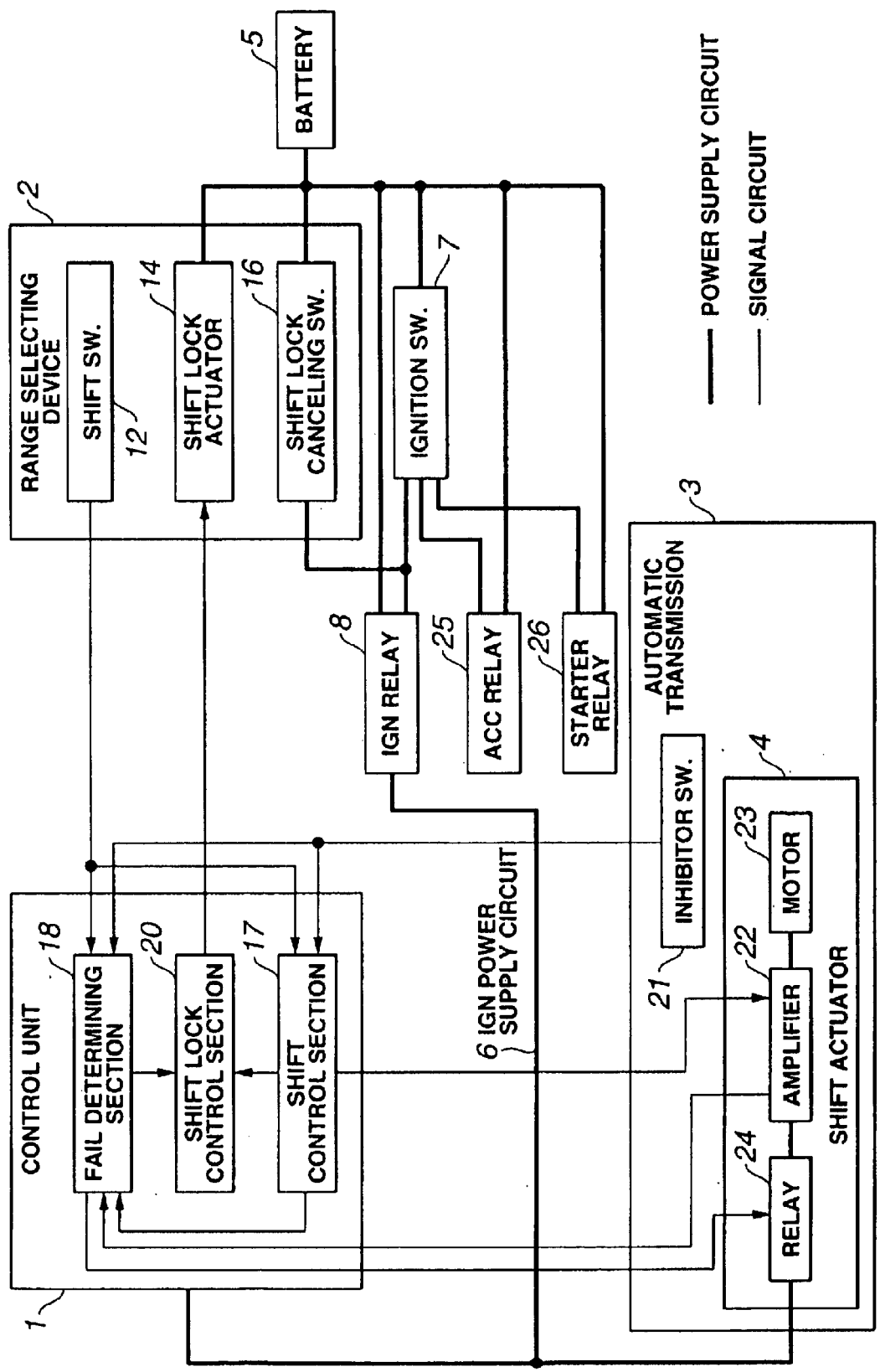
FIG. 1 is a wiring block diagram of an automatic transmission system according to a first embodiment of the present invention.

As shown in FIG. 1, the automatic transmission system comprises a control unit 1, a range selecting device 2 and an automatic transmission 3 which are electronically connected with each other through signal circuits to exchange information in the form of electric signals through signal circuits. Further, control unit 1, range selecting device 2 and automatic transmission 3 receive electric power of battery 5 through electric power circuits. Particularly, in reply to the turning-on of an ignition switch 7 (ING ON), a battery 5 supplies electric power to a main power supply circuit (IGN power supply circuit) 6 through an ignition relay (IGN relay) 8. Control unit 1 and a shift actuator 4 of a shift-by-wire system for automatic transmission 3 receive electric power from IGN power supply circuit 6. That is, the automatic control transmission system employs a shift-by-wire shifting system.

Range selecting device 2 comprises a shift button set 30 acting as an operating section, a shift switch 12, a shift lock actuator 14 and a shift lock canceling switch 16. The operating section may be a shift lever manipulated by a driver. Shift switch 12 detects a range position selected by the driver through shift button set 30. Shift lock actuator 14 controls a shift lock mechanism 13 which prevents a change of the selected operation range during the turn-off state of ignition switch 7 (IGN OFF state). Shift lock canceling switch 16 is interlocked with a shift lock canceling mechanism 15. Shift lock actuator 14 always receives electric power from battery 5 since shift lock actuator 14 is directly connected to battery 5 and is not affected by the turning on and off of ignition switch 7.

Automatic transmission 3 comprises a shift actuator 4 and an inhibitor switch 21, in addition to a torque converter, a gear train and a hydraulic system. Shift actuator 4 comprises a relay 24, an amplifier 22 and a motor 23. Automatic transmission 3 makes shifting upon being set in an actual operation range from a plurality of operation ranges by the operation of shift actuator 4 according to the electric signals from control unit 1.

Control unit 1 comprises a shift control section 17, a fail determining section 18 and a shift lock control section 20. Shift control section 17 outputs an operation signal for a motor 23 to an amplifier 22 of shift actuator 4 in automatic transmission 3 on the basis of a state of shift switch 12 and a signal of inhibitor switch 21 which is indicative of an actual range position of automatic transmission 3. The operation of shift control section 17 is terminated when ignition switch 7 is turned off (IGN OFF). That is, the shift actuator 4 of automatic transmission 3 and control unit 1 constitute the shift-by-wire system (mechanism) so that the shift-by-wire system converts the command operation range selected in range selecting device 2 into an electric signal and changes an actual operation range of the automatic transmission 3 into the selected command operation range by driving shift actuator 4 according to the electric signal.

Fail determining section 18 determines an abnormality (FAIL) of the automatic transmission system on the basis of signals from various sections. When fail determining section 18 determines that the automatic transmission system is in a fail state, the fail determining section 18 outputs a fail signal to shift lock control section 20 and a relay 24 of shift actuator 4 to shut off electric power to shift actuator 4. Fail determining section 18 determines that the automatic transmission system is in fail when a breakage of a wire or over-current flowing is caused in one of the sections in the automatic transmission system.

Shift lock control section 20 sends a drive signal to shift lock actuator 14 to operate shift lock mechanism 13 when shift control section 17 determines that the control is terminated in response to IGN-OFF state or when fail determining section 18 determines that the automatic transmission system is in the fail state. Further, shift lock control section 20 sends a drive signal to shift lock actuator 14 so as to cancel the operation of shift lock mechanism 13 when shift control section 17 determines that the automatic transmission system is in IGN-ON state.

An engine starter relay 26 and an accessory relay 25 for a car audio system and the like are further connected to battery 5 through ignition switch 5.

Figure 2:
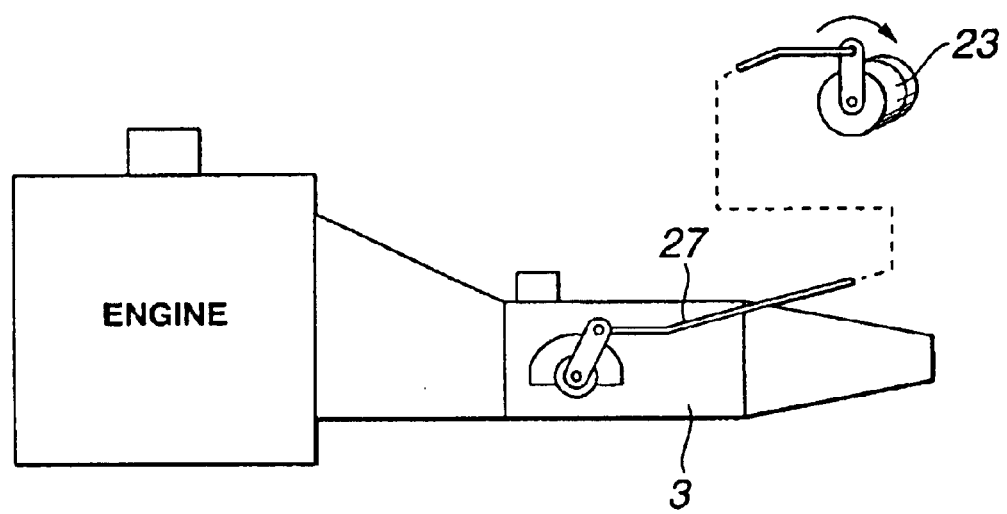
FIG. 2 is a schematic view showing a range selecting mechanism in an automatic transmission employed in the automatic transmission system.

As shown in FIG. 2, a mechanical construction of a range selecting mechanism in automatic transmission 3 employs motor 23 and a wire cable (or rod) 27 through which the range selecting operation by motor 23 is inputted into automatic transmission 3. The range selecting operation of the range selecting mechanism of automatic transmission 3 is achieved by the operations of a manual valve and a parking mechanism of automatic transmission 3 in response to the signal from control unit 1.

Figure 3:
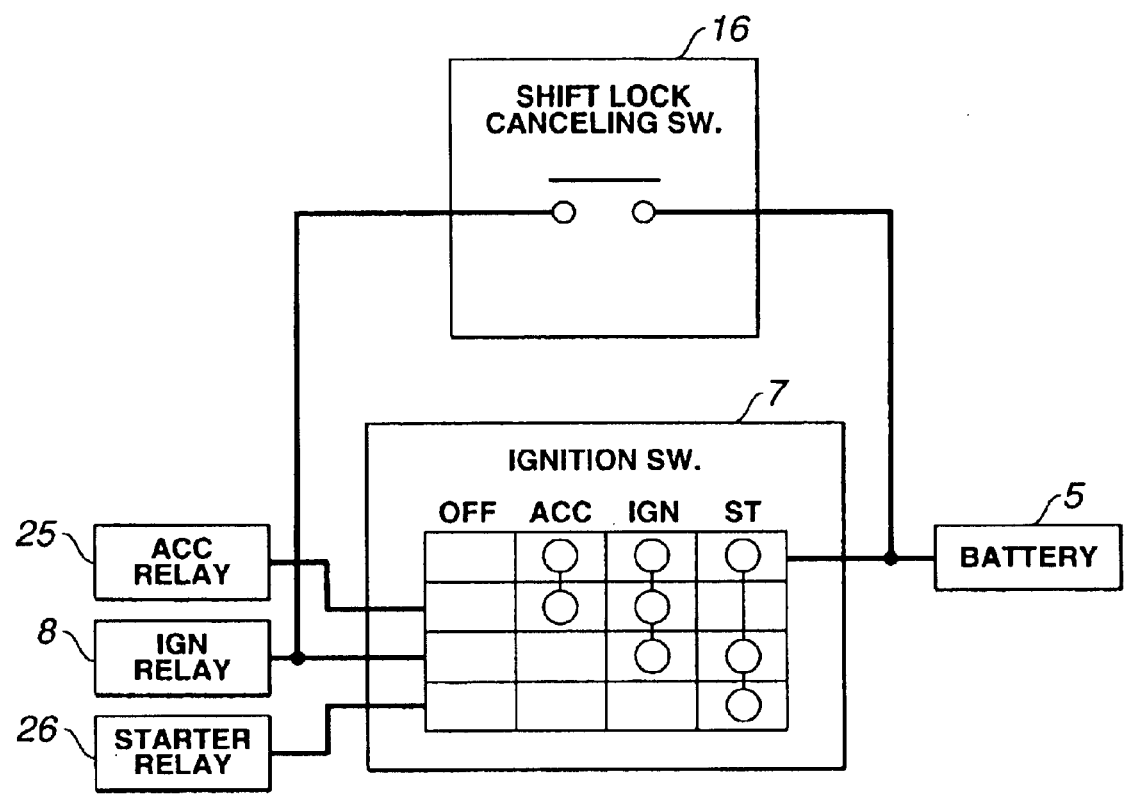
FIG. 3 is a circuit diagram showing an ignition switch and a shift lock canceling switch employed in the automatic transmission system of FIG. 1.

FIG. 3 shows a detailed circuit for ignition switch 7 and shift lock canceling switch 16. Battery 5 is connected to ACC relay 25, IGN relay 8 and starter relay 26 through an ignition switch 7, and is connected to IGN relay through shift lock canceling switch 16. As is clear from FIG. 3, according to the switch modes of OFF, ACC, IGN and ST of ignition switch 7, the connation conditions of ACC relay 25, IGN relay 8 and starter relay 26 relative to battery 5 is changed.

On the other hand, by turning on shift lock canceling switch 16, IGN relay 8 operates such that battery 5 supplies electric power to IGN power supply circuit 6, as is similar to the operation in the case of the turning on of ignition switch 7 (IGN ON), regardless the turning on and off state of ignition switch 7. ACC relay 25 is not affected by the operation of shift lock canceling switch 16.

Figure 4:
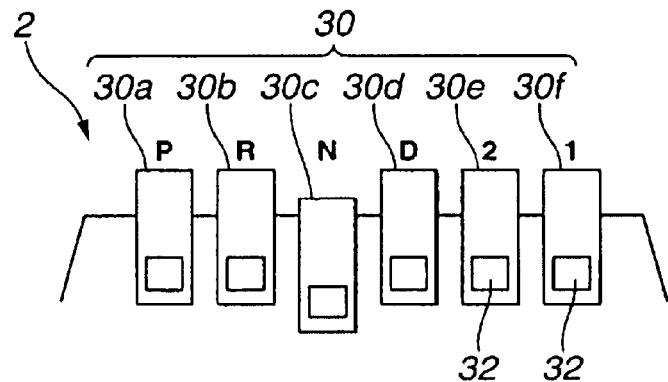
FIG. 4 is a side view showing a range selecting device in the automatic transmission system of FIG. 1.
Figure 5:
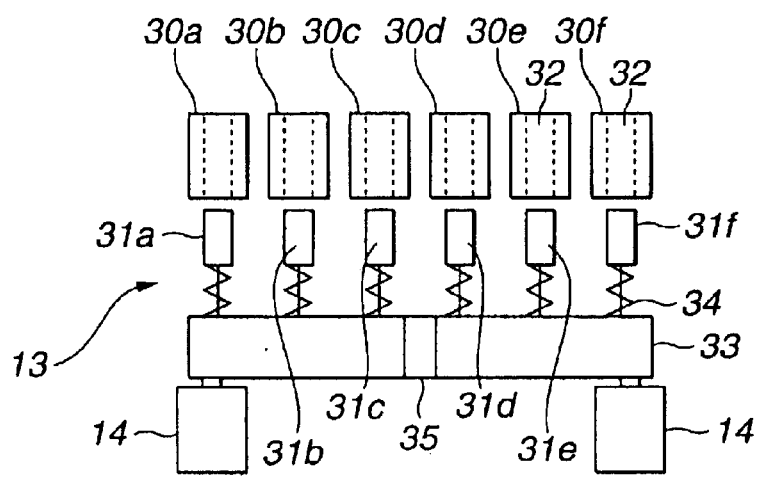
FIG. 5 is a plan view showing a shift lock mechanism of the range selecting device.
Figure 6:
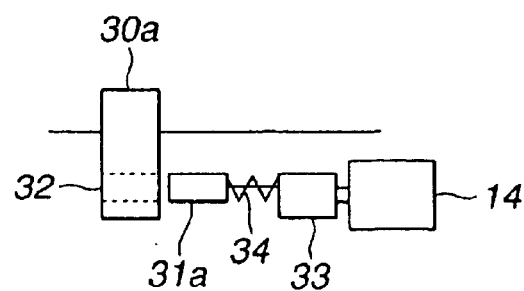
FIG. 6 is a side view showing the shift lock mechanism.

FIGS. 4 to 6 show range selecting device 2, shift lock mechanism 13 and shift lock canceling mechanism 15.

Shift button set 30 is of a button type and acts as a manual operation section of range selecting device 2. Shift button set 30 comprises shift buttons 30a, 30b, 30c, 30d, 30e and 30f corresponding to selectable ranges such as P (parking) range, R (reverse) range, N (neutral) range, D (drive) range, 2 range and 1 range, respectively. By pressing a desired one of shift buttons 30a to 30f, shift switch 12 corresponding to the pressed button is turned on so as to select a desired (command) operation range.

As shown in FIG. 5, a plurality of lock holes 32 are formed at lower portions of the respective shift buttons 30a to 30f so that each of keys 31a to 31f of a shift lock mechanism is insertable into each lock hole 32. Each of keys 31a to 31f is installed on a plate 33 through a spring 33 so as to be movable relative to plate 33. Both ends of plate 33 are installed on shift lock actuator 14. Shift lock actuator 14 selectively takes one of two positions of a forward position and a backward position, and is turned on (energized) only when the vehicle is moving.

Figure 7:
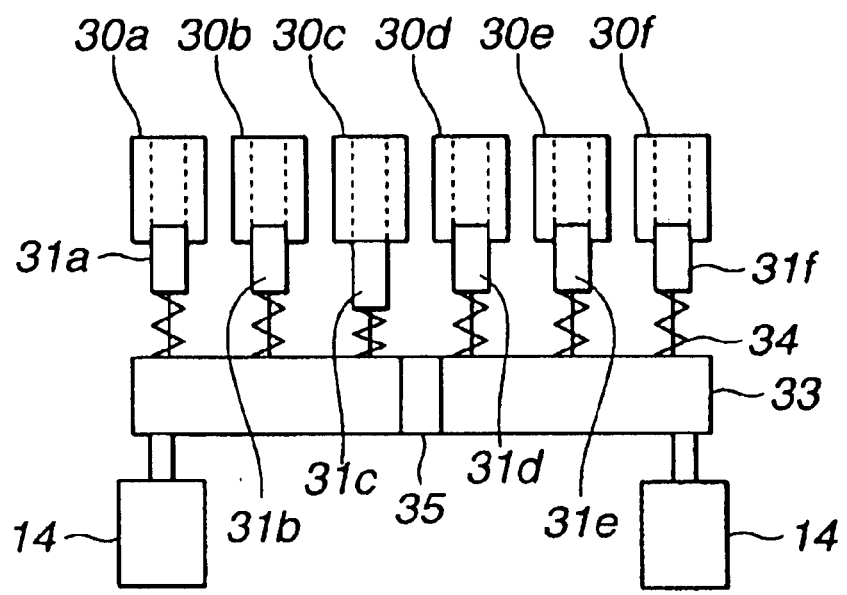
FIG. 7 is a plan view employed for explaining the shift lock mechanism.
Figure 8:
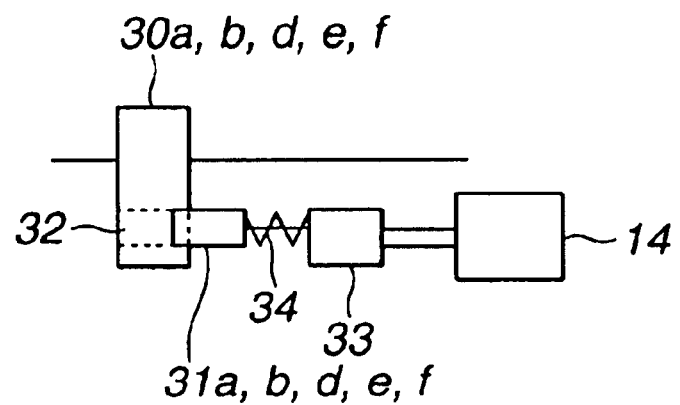
FIG. 8 is a side view employed for explaining the shift lock mechanism.
Figure 9:
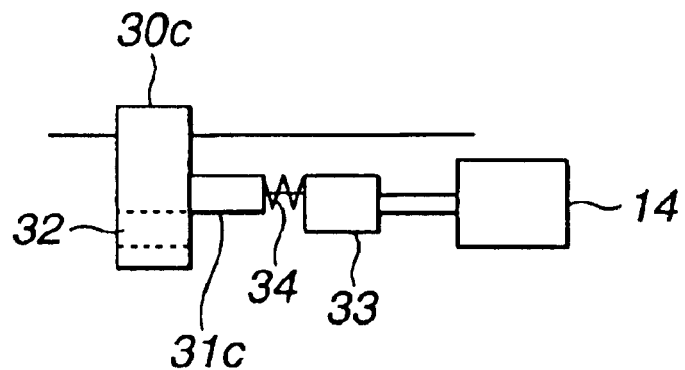
FIG. 9 is a plan view employed for explaining the shift lock mechanism.

By forwardly driving shift lock actuator 14 to take the forward position, plate 33 and keys 31a to 31f except for the pressed shift button (shift button 30c of N range in FIG. 4) and key (30c) corresponding to the pressed shift button are forwardly moved from a state shown in FIGS. 5 and 6, and the other keys 31a, 31c, 31d, 31e and 31f are inserted into lock holes 32 of the corresponding shift buttons 30a, 30b, 30d, 30e and 30f, respectively, as shown in FIGS. 7 and 8. Since the pressed shift button (30c of N range) is offset from lock hole 32 of the corresponding key 31c as shown in FIGS. 7 and 9, it is not inserted into the lock hole 32. Accordingly, displacements of the other shift buttons is restricted (prevented) and therefore the shift lock is achieved.

By backwardly driving shift lock actuator 14 to take the backward position, keys 31a to 31f are released from lock holes 32 and shift button 30a 30f are released therefrom. Accordingly, the shift lock state is canceled.

Figure 10:
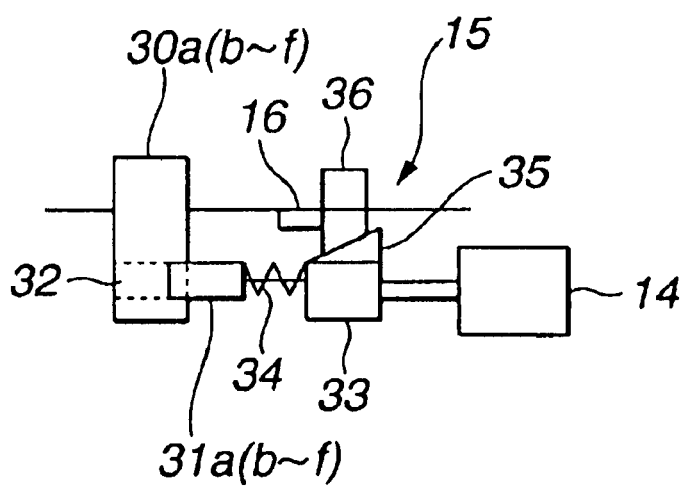
FIG. 10 is a side view showing a shift lock canceling mechanism of the range selecting device.
Figure 11:
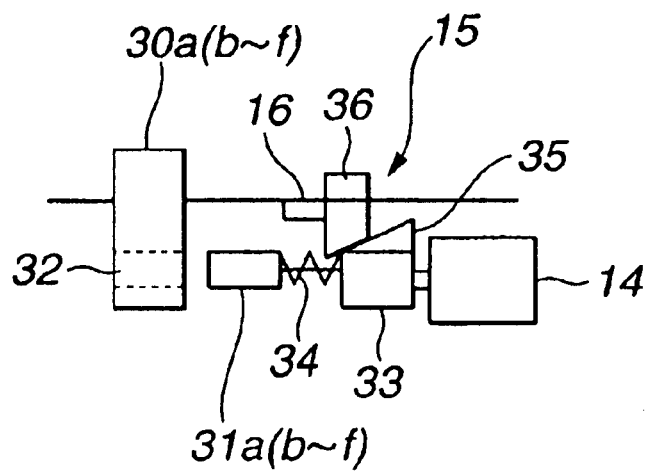
FIG. 11 is a side view employed for explaining the shift lock mechanism.

On the other hand, as a shift lock canceling mechanism 14 for canceling the shift lock of shift lock mechanism 13, a shift lock canceling cam 35 is provided at a center of plate 33 of shift lock mechanism 13 as shown in FIGS. 5 and 10. Shift lock canceling cam 35 is formed into a right angled triangle and installed on plate 33 so that an oblique surface is faced with a shift lock canceling button 36 operated by the driver, as shown in FIG. 10. Shift lock canceling switch 16 interlocked with shift lock cancel button 36 is disposed adjacent to shift lock cancel button 36.

By pressing shift lock canceling button 36 under the shift lock state wherein keys 31a to 31f of shift lock mechanism 13 are inserted into lock holes 32 of shift buttons 30a to 30f shown in FIG. 10, an oblique surface at a lower surface of shift lock cancel button 36 is contacted with shift lock cancel cam 35, and plate 33 is backwardly moved. Therefore, the shift lock is canceled thereby. Further, shift lock canceling switch 16 is turned on in response to the operation of shift lock canceling button 36.

By pressing shift lock cancel button 36 under a shift lock condition that keys 31a to 31f are inserted into lock holes 32 of shift buttons 30a to 30f, respectively as shown in FIG. 10, the oblique surface of the shift lock canceling button 36 presses an oblique surface of shift lock canceling cam 35 and moves plate 33 rearward to cancel the shift lock. Further, in response to the operation of shift lock canceling button 36, shift lock canceling switch 16 is turned on.

With this arrangement of the automatic transmission system according to the first embodiment of the present invention, when ignition switch 7 is put in IGN OFF state (IGN OFF), shift lock control section 20 operates the shift lock mechanism so that shift buttons 30a to 30f are put in the shift lock condition. Therefore, when IGN OFF, that is, when the power supply of shift actuator 4 of the shift-by-wire mechanism is turned off, even if the shift position is set at a position except for P range, the displacement of shift buttons 30a to 30f is restricted. This arrangement solves a problem that when shift actuator 4 cannot be driven, the range selected by shift buttons 30a to 30f becomes different from the range of automatic transmission 3.

Further, when the automatic transmission system is put in a fail state, shift lock control section 20 operates shift lock mechanism 13 so that shift buttons 30a to 30f are put in the shift lock condition, and fail determining section 18 shuts off the power supply to shift actuator 4. Therefore, during the fail state, this arrangement according to the present invention prevents the automatic transmission system from incorrectly performing, and solves a problem that the range selected through shift buttons 30 to 30f becomes different from the range of automatic transmission 3.

On the other hand, when shift lock canceling mechanism 15 operates to cancel the shift lock of shift lock mechanism 13, IGN relay 8 operates in reply to the turning on of shift lock canceling switch 16 regardless of the condition of ignition switch 7. By this operation of IGN relay 8, electric power is supplied to IGN power supply circuit 6. That is, shift actuator 4 is put in an operable state according to the turning-on of shift lock canceling switch 16.

Therefore, even if shift buttons 30a to 30f are controlled after the cancellation of the shift lock, the range selected by shift buttons 30a to 30f corresponds with the range of automatic transmission 3 by the above-discussed displacement restricting (preventing) setting. That is, the above-discussed arrangement according to the present invention prevents the discord between the range selected by shift buttons 30a to 30f and the range of automatic transmission 3.

Since the electronic circuit of the automatic transmission system according to the present invention is arranged such that IGN relay 8 operates in reply to the turning on of shift lock canceling switch 16, it is possible to supply electric power to control unit 1, shift actuator 4 and the like in a block by turning on IGN power supply circuit 6 without independently controlling the power supply to control unit 1, shift actuator 4 and the like.

Figure 12:
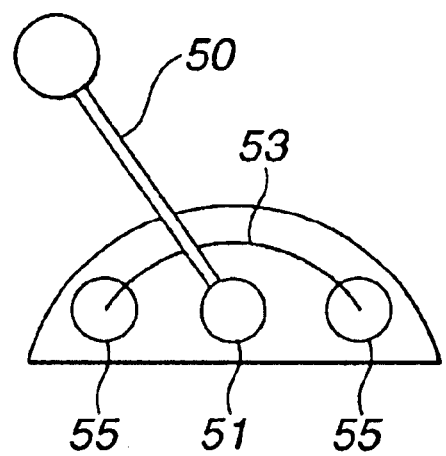
FIG. 12 is a side view showing a range selecting device employed in a second embodiment according to the present invention.
Figure 13:
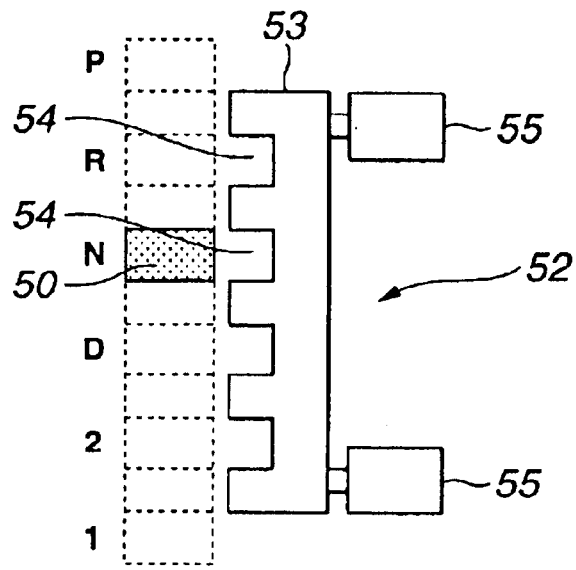
FIG. 13 is a plan view of a shift lock mechanism of the second embodiment.
Figure 14:
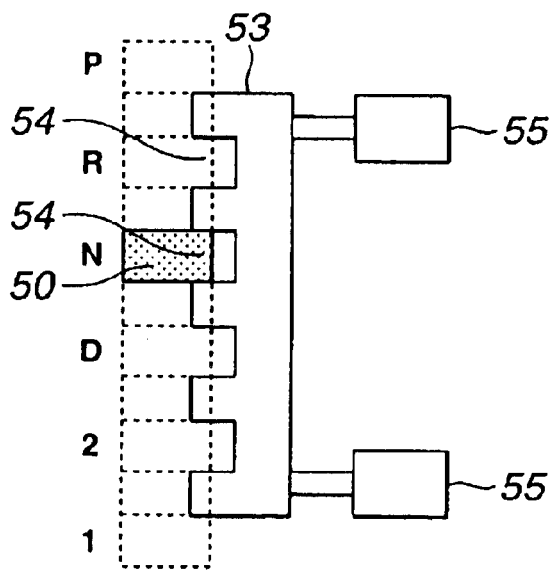
FIG. 14 is a plan view employed for explaining the operation of the shift lock mechanism.

Referring to FIGS. 12 to 14, there is shown a second embodiment of the automatic transmission system according to the present invention. The automatic transmission of the second embodiment employs a lever-type operating section of range selecting device 2 and a shift-by-wire shifting system.

As shown in FIG. 12, a lever 50 of range selecting device 2 is movable on positions corresponding to P range, R range, N range, D range, 2 range and 1 range which are aligned in the fore-and-aft direction. A shift switch 51 for detecting the position of lever 50 is provided on the base portion of lever 50.

A shift lock plate 53 of shift lock mechanism 52 is provided at a side portion of lever 50. Shift lock plate 53 comprises a plurality of engaged portions 54 and is formed into a tandem type. Lever 50 is capable of engaging with engaged portions 54. Both ends of shift lock plate 53 is installed on a shift lock actuator 55. Shift lock actuator 55 selectively takes one of two positions of a forward portion and a backward position. Only when shift lock actuator 55 is moving, electric power is supplied to shift lock actuator 55.

By forwardly driving shift lock actuator 55 to take the forward position, shift lock plate 53 is moved forward from a condition shown in FIG. 13, and one of engaged portion 54 is engaged with lever 50 as shown in FIG. 14. By this operation, the displacement of lever 50 is restricted (inhibited) and therefore the shift lock is achieved.

By backwardly driving shift lock actuator 55 to take the backward position, shift lock plate 53 is moved backwardly, and engaged portions 54 is released from lever 50. That is, lever 50 becomes free from engaged portions 54 and therefore the shift lock is canceled.

Although a shift lock canceling mechanism is not shown in FIGS. 13 and 14, a mechanism similar to shift lock cancel mechanism 15 shown in FIG. 10 may be installed in the system. The other construction of the second embodiment is basically the same as that of the first embodiment shown in FIGS. 1 and 2. Accordingly, as is similar to the button type operating section of range selecting device 2 of the first embodiment, the automatic transmission system of the second embodiment prevents the discord between the selected range selected by range selecting device 2 and the actual range in automatic transmission 3.

Each of shift lock mechanisms 13 and 52 may be arranged so as to restrict the displacement of control section (shift button set 30 and lever 50) of range selecting device 2 at least from the parking range.

This application is based on Japanese Patent Applications No. 2001-111168 filed on Apr. 10, 2001 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An automatic transmission system for a vehicle, comprising:

an automatic transmission selectively taking a plurality of operation ranges;

a range selector operated by a driver of the vehicle to select one of command operation ranges;

a shift-by-wire system converting a selected command operation range into an electric signal and changing an actual operation range of the automatic transmission into the selected command operation range by driving an actuator according to the electric signal;

a lock mechanism restricting an operation of the range selector when the shift-by-wire system is electrically turned off ; and a lock canceling mechanism which is operable for canceling the restricting operation of the lock mechanism, the shift-by-wire system being electrically turned on in response to the canceling operation of the lock canceling mechanism.

2. The automatic transmission system as claimed in claim 1, wherein the shift-by-wire system is connected through a cancel switch to a power supply source, the power supply source being connected to the shift-by-wire mechanism through an ignition switch, the cancel switch being turned on in response to the canceling operation of the lock canceling mechanism.

3. The automatic transmission as claimed in claim 1, wherein the shift-by-wire system is electrically turned off when an ignition switch is turned off.

4. The automatic transmission as claimed in claim 1, wherein the shift-by-wire system is electrically turned off when an abnormality of the automatic transmission is detected.

5. An automatic transmission system for a vehicle, comprising:

an automatic transmission selectively taking a plurality of operation ranges;

a range selector selecting one of command operation ranges in response to a driver's command;

a lock actuator locking the range selector in response to a command lock signal;

a lock canceling mechanism canceling a restricting operation of the lock actuator according to a manual operation of a driver of the vehicle;

a shift actuator changing an actual operation range of the automatic transmission in response to a control signal;

a lock canceling switch electrically turning on the shift actuator when the lock canceling mechanism executes an canceling operation of the restricting operation; and a control unit outputting the control signal to the shift actuator according to the selected command operation range of the range selector;

wherein the lock actuator locks the range selector when the shift actuator is electrically turned off.

6. The automatic transmission system as claimed in claim 5, wherein the control unit outputs the lock command signal to the lock actuator at least when an ignition switch of the vehicle is turned off and when the automatic transmission is put in an abnormal state.

7. A method of controlling an automatic transmission system for a vehicle, the automatic transmission comprising an automatic transmission which selectively takes a plurality of operation ranges, a range selector which is operated by a driver of the vehicle to select one of command operation ranges and a shift-by-wire system which converts the selected command operation range into an electric signal and changes an actual operation range of the automatic transmission into the selected command operation range by driving an actuator according to the electric signal, the method comprising:

restricting the operation of the range selector when the shift-by-wire mechanism is electrically turned off ; and electrically turning on the shift-by-wire system in response to a canceling operation of a lock canceling mechanism which is operable for canceling the restricting operation of the lock mechanism.

8. An automatic transmission system for a vehicle, comprising:

transmission means for selectively taking a plurality of operation ranges;

selector means, operated by a driver of the vehicle, for selecting one of command operation ranges according to a driver's command;

shift-by-wire means for converting a selected command operation range into an electric signal and for changing an actual operation range of the transmission means into the selected command operation range according to the electric signal;

lock means for restricting the operation of the selector means when the shift-by-wire means is electrically turned off ; and a lock canceling mechanism which is operable for canceling the restricting operation of the lock mechanism, the shift-by-wire system being electrically turned on in response to the canceling operation of the lock canceling mechanism.

* * * * *